(12) United States Patent
Virtue

(10) Patent No.: US 11,287,013 B2
(45) Date of Patent: Mar. 29, 2022

(54) ELECTRICALLY CONDUCTIVE BELT

(71) Applicant: The Timken Company, North Canton, OH (US)

(72) Inventor: Daniel W. Virtue, Rogersville, MO (US)

(73) Assignee: The Timken Company, North Canton, OH (US)

( * ) Notice: Subject to any disclaimer, the term of this patent is extended or adjusted under 35 U.S.C. 154(b) by 502 days.

(21) Appl. No.: 16/335,528

(22) PCT Filed: May 30, 2018

(86) PCT No.: PCT/US2018/035016
§ 371 (c)(1),
(2) Date: Mar. 21, 2019

(87) PCT Pub. No.: WO2019/018068
PCT Pub. Date: Jan. 24, 2019

(65) Prior Publication Data
US 2019/0346014 A1    Nov. 14, 2019

Related U.S. Application Data

(60) Provisional application No. 62/534,286, filed on Jul. 19, 2017.

(51) Int. Cl.
*F16G 1/21*    (2006.01)
*F16G 1/28*    (2006.01)
(Continued)

(52) U.S. Cl.
CPC .............. *F16G 1/21* (2013.01); *B29D 29/08* (2013.01); *B32B 3/263* (2013.01); *B32B 5/26* (2013.01);
(Continued)

(58) Field of Classification Search
CPC ..... F16G 1/21; F16G 1/08; F16G 1/28; F16G 5/20; F16G 5/06; B32B 5/26;
(Continued)

(56) References Cited

U.S. PATENT DOCUMENTS 3,323,637 A    6/1967  Jenkins
3,792,520 A *  2/1974  Weiner .................. D06M 11/83
                                                      428/626
(Continued)

FOREIGN PATENT DOCUMENTS

CN    1513092 A    7/2004
CN    1840935 A    10/2006
(Continued)

OTHER PUBLICATIONS

[NPL-1] Han (KR 2010-0083565 A), Jul. 22, 2010 (KIPRIS machine translation to English). (Year: 2010).*
(Continued)

*Primary Examiner* — David Sample
*Assistant Examiner* — Donald M Flores, Jr.
(74) *Attorney, Agent, or Firm* — Michael Best & Friedrich LLP

(57) ABSTRACT

A conductive anti-static drive belt includes a first or drive surface having a plurality of tooth formations therein with a land portion formed between each adjacent pair of teeth. The drive surface is provided by a fabric layer having electrically conductive properties. The fabric layer has an interior surface opposite the drive surface. A second surface is provided opposite the drive surface. The second surface is provided by a polymeric body that conforms to and is mated with the interior surface of the fabric layer. At least one tensile reinforcement member is at least partially encased in the polymeric body and extends along the interior surface of the fabric C layer at each land portion throughout a loop formed (Continued)

by the belt. A conductive strand is at least partially encased in the polymeric body and extends along the interior surface of the fabric layer at each land portion.

13 Claims, 2 Drawing Sheets

(51) Int. Cl.
*F16G 1/08* (2006.01)
*B29D 29/08* (2006.01)
*B32B 3/26* (2006.01)
*B32B 27/06* (2006.01)
*B32B 27/18* (2006.01)
*B32B 5/26* (2006.01)

(52) U.S. Cl.
CPC .............. *B32B 27/06* (2013.01); *B32B 27/18* (2013.01); *F16G 1/08* (2013.01); *F16G 1/28* (2013.01); *B29K 2995/0005* (2013.01); *B32B 2307/202* (2013.01); *B32B 2307/21* (2013.01); *B32B 2433/04* (2013.01); *Y10T 428/24355* (2015.01)

(58) Field of Classification Search
CPC ......... B32B 3/263; B32B 27/06; B32B 27/18; B32B 2307/21; B32B 2307/202; B32B 2433/04; B29D 29/08; Y10T 428/24355; B29K 2995/0005
See application file for complete search history.

(56) References Cited

U.S. PATENT DOCUMENTS

| | | | |
|---|---|---|---|
| 4,457,743 A | | 7/1984 | Robecchi et al. |
| 4,626,232 A | * | 12/1986 | Witt .................... F16G 5/20 474/205 |
| 4,701,154 A | | 10/1987 | Rausch |
| 4,708,703 A | | 11/1987 | Macchiarulo et al. |
| 4,721,498 A | | 1/1988 | Grob |
| 4,740,192 A | * | 4/1988 | Mashimo .............. B29C 70/081 474/263 |
| 4,758,213 A | | 7/1988 | Tanaka et al. |
| 4,767,389 A | | 8/1988 | Habegger et al. |
| 4,773,896 A | | 9/1988 | Bouteiller et al. |
| 5,173,361 A | | 12/1992 | Yamashita et al. |
| 5,351,530 A | | 10/1994 | Macchiarulo et al. |
| 5,399,127 A | | 3/1995 | Foley et al. |
| 5,417,619 A | | 5/1995 | Tajima et al. |
| 5,961,412 A | | 10/1999 | Takahashi |
| 6,228,448 B1 | | 5/2001 | Ndebi et al. |
| 6,770,004 B1 | | 8/2004 | Lofgren et al. |
| 6,920,745 B2 | | 7/2005 | Bruyneel et al. |
| 7,328,785 B2 | | 2/2008 | Hart et al. |
| 8,192,316 B2 | | 6/2012 | Marc |
| 8,312,987 B2 | | 11/2012 | Lynn et al. |
| 9,829,066 B2 | | 11/2017 | Thomas et al. |
| 2002/0187869 A1 | | 12/2002 | Martin et al. |
| 2004/0121869 A1 | | 6/2004 | Becella |
| 2005/0215372 A1 | * | 9/2005 | Wood .................. F16G 1/16 474/205 |
| 2010/0197435 A1 | * | 8/2010 | Gewald ................. B65G 15/34 474/263 |
| 2011/0237374 A1 | | 9/2011 | Nakao et al. |
| 2015/0157001 A1 | | 6/2015 | Mayer et al. |
| 2015/0259176 A1 | | 9/2015 | Goeser et al. |
| 2015/0285334 A1 | | 10/2015 | Thomas et al. |
| 2017/0122404 A1 | | 5/2017 | Gibson |

FOREIGN PATENT DOCUMENTS

| | | | |
|---|---|---|---|
| CN | 106457708 A | 2/2017 | |
| DE | 102014008622 A1 | 12/2015 | |
| KR | 20100083565 A * | 7/2010 | ............... F16G 1/28 |
| WO | 2010082765 | 1/2010 | |
| WO | 20150157001 A1 | 10/2015 | |

OTHER PUBLICATIONS

Chinese Patent Office Action and Search Report for Application No. 201880004137.0 dated Apr. 15, 2020 (25 pages, English translation included).
European Patent Office Examination Report for Application No. 18732561.8 dated Jun. 19, 2020 (4 pages).
Chinese Patent Office Action for Application No. 201880004137.0 dated Nov. 27, 2020 (23 pages, English translation included).
International Search Report and Written Opinion for Application No. PCT/US2018/035016 dated Sep. 14, 2018 (12 pages).

* cited by examiner

ELECTRICALLY CONDUCTIVE BELT

CROSS-REFERENCE TO RELATED APPLICATIONS

This application claims priority to U.S. Provisional Patent Application No. 62/534,286, filed Jul. 19, 2017, the entire contents of which are incorporated by reference herein.

BACKGROUND

The invention relates to power transmission belts, for example, toothed belts that are commonly used in a synchronous drive (e.g., for various industrial and automotive power transmission and/or synchronization applications). During running of such belts along pulleys or sprockets, static electricity can build up and discharge if not otherwise mitigated. Mitigation can be carried out through establishing electrical conductivity in the belt, which is often primarily polymeric and non-conductive in construction. However, establishing electrical conductivity in belts that are otherwise non-conductive poses significant challenges for making a belt with sufficient conductivity that is long-lasting.

SUMMARY

In one aspect, the invention provides a conductive anti-static drive belt. The belt includes a first surface provided as a drive surface having a plurality of tooth formations therein with a land portion formed between each adjacent pair of the plurality of tooth formations. The drive surface is provided by a fabric layer having electrically conductive properties. The fabric layer has an interior surface opposite the drive surface. A second surface of the belt is provided opposite the drive surface, and the second surface is provided by a polymeric body that conforms to and is mated with the interior surface of the fabric layer. At least one tensile reinforcement member is at least partially encased in the polymeric body to extend along the interior surface of the fabric layer at each land portion throughout a loop formed by the belt. A conductive strand is at least partially encased in the polymeric body to extend along the interior surface of the fabric layer at each land portion.

In another aspect, the invention provides a method of manufacturing a conductive anti-static drive belt. A conductive fabric layer is installed onto a drum so that a fabric layer surface is exposed opposite the drum. Both a tensile reinforcement member and an additional conductive strand are spirally wrapped onto the fabric layer surface. A polymeric body compound is applied in an un-cured state over the spirally wrapped tensile reinforcement member and the additional conductive strand. The polymeric body compound and the conductive fabric layer are formed to the drum and the polymeric body compound is cured. The belt is removed from the drum.

Other aspects of the invention will become apparent by consideration of the detailed description and accompanying drawings.

DETAILED DESCRIPTION

Before any embodiments of the present invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Although it is known to manufacture electrically conductive belts that resist static electricity build-up during use, typical rubber compound properties are often greatly influenced by the type of carbon black added to the belt compound. Because of this, it may not be practical to add enough of the conductive type of carbon black to make a given compound conductive. In this case, the tooth fabric facing must be made conductive. However, conductivity of the facing fabric may diminish significantly with use as the belt meshes with the sprockets and wears. Further, if the belt doesn't fail first, it is conceivable that the fabric could be completely worn off of the belt surface. With only the fabric being conductive and being worn off (or of diminished conductivity) it is possible that static charges could build up and cause a spark.

Figure 1:
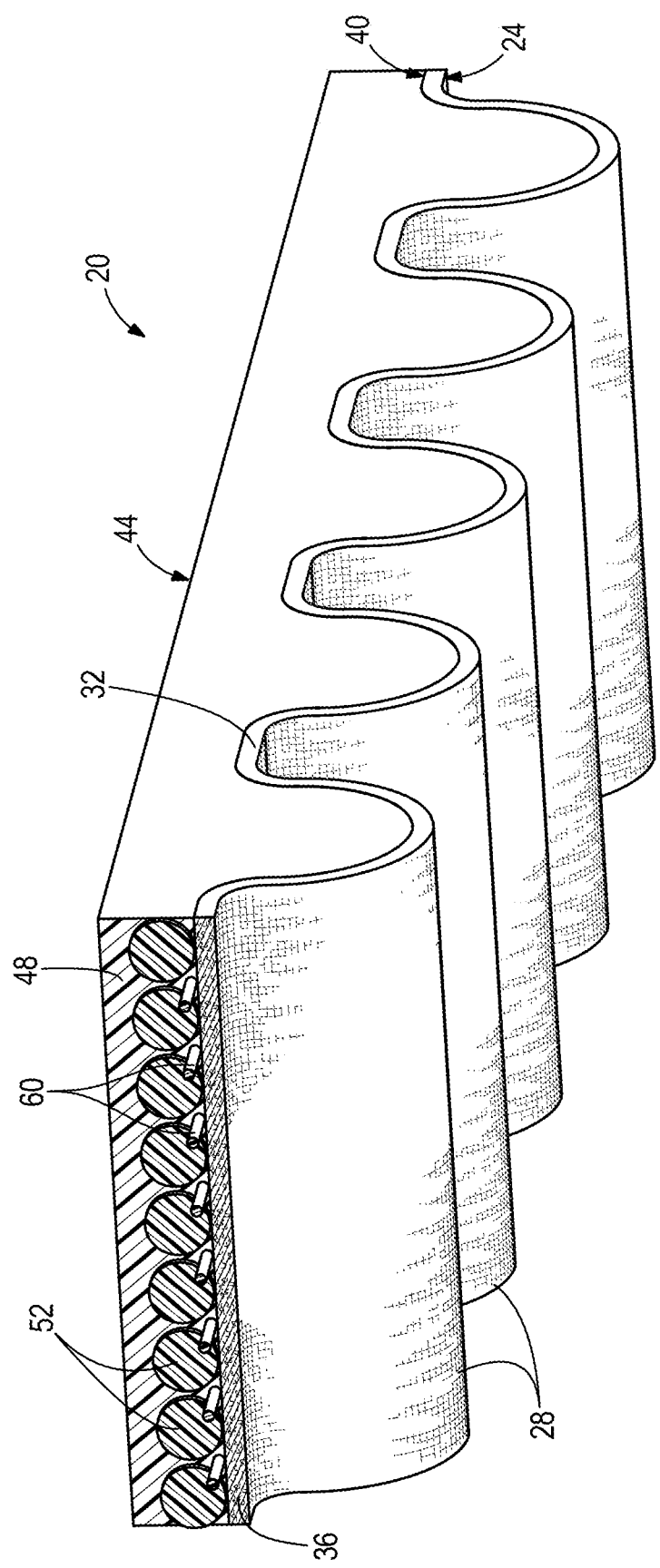
FIG. 1 is a partial cross-section of a conductive timing belt according to one embodiment of the present invention.

FIG. 1 illustrates a synchronous or toothed belt 20 according to one embodiment of the invention. The belt 20 provides electrical conductivity to inhibit static electricity build-up during use as the belt 20 is run across pulleys or toothed sprockets (not shown). The belt 20 is formed in an endless loop, and only a segment is shown in section, with the understanding that the construction of the belt 20 is the same throughout the loop. The belt 20 includes a first or drive surface 24 having a plurality of tooth formations 28, or simply teeth 28. Between each adjacent tooth pair is a land portion 32. The drive surface 24 is provided by a fabric layer 36, or fabric facing, having electrically conductive properties. For example, the fabric layer 36 can be woven or knit from threads or yarn, at least some of which is electrically conductive. The fabric layer 36 may also be coated with conductive polymers (thermoset or thermoplastic) that are made conductive through various means such as carbon black, carbon nanotubes, or metallic powders and the like. The fabric layer 36 has an interior surface 40 opposite the drive surface 24. In some constructions, the belt 20 can include a fabric facing comprising two or more layers of conductive fabric, and the interior surface 40 is an interior surface of the multi-layer fabric facing. A second surface 44 of the belt 20 is provided opposite the drive surface 24. The second surface 44 can be provided by a polymeric body 48 that conforms to and is securely fixed with the interior surface 40 of the fabric layer 36. A tensile section of the belt 20 is formed by one or more tensile reinforcement members 52 at least partially encased in the polymeric body 48. The tensile reinforcement members 52 include multiple continuous windings or turns around the entire loop formed by the belt 20. Each tensile reinforcement member 52 is formed of a cord of relatively non-stretchable material and extends along the interior surface 40 of the fabric layer 36 at each land portion 32 throughout the loop formed by the belt 20. For example, the material of the one or more tensile reinforcement members 52 can have an elastic modulus greater than that of a material of the polymeric body 48. In some constructions, the material of the one or more tensile reinforcement members 52 has an elastic modulus greater than 50 GPa, or even greater than 75 GPa, while the material of the polymeric body 48 has an elastic modulus of less than 10 GPa, or even less than 1 GPa. Non-limiting examples of materials of the tensile reinforcement member 52 include fiberglass, carbon fiber, para-aramid, or PBO (poly(p-phenylene-2,6-benzobisoxazole)). As described further below, the tensile reinforcement member 52 can be conductive or non-conductive.

Figure 2:
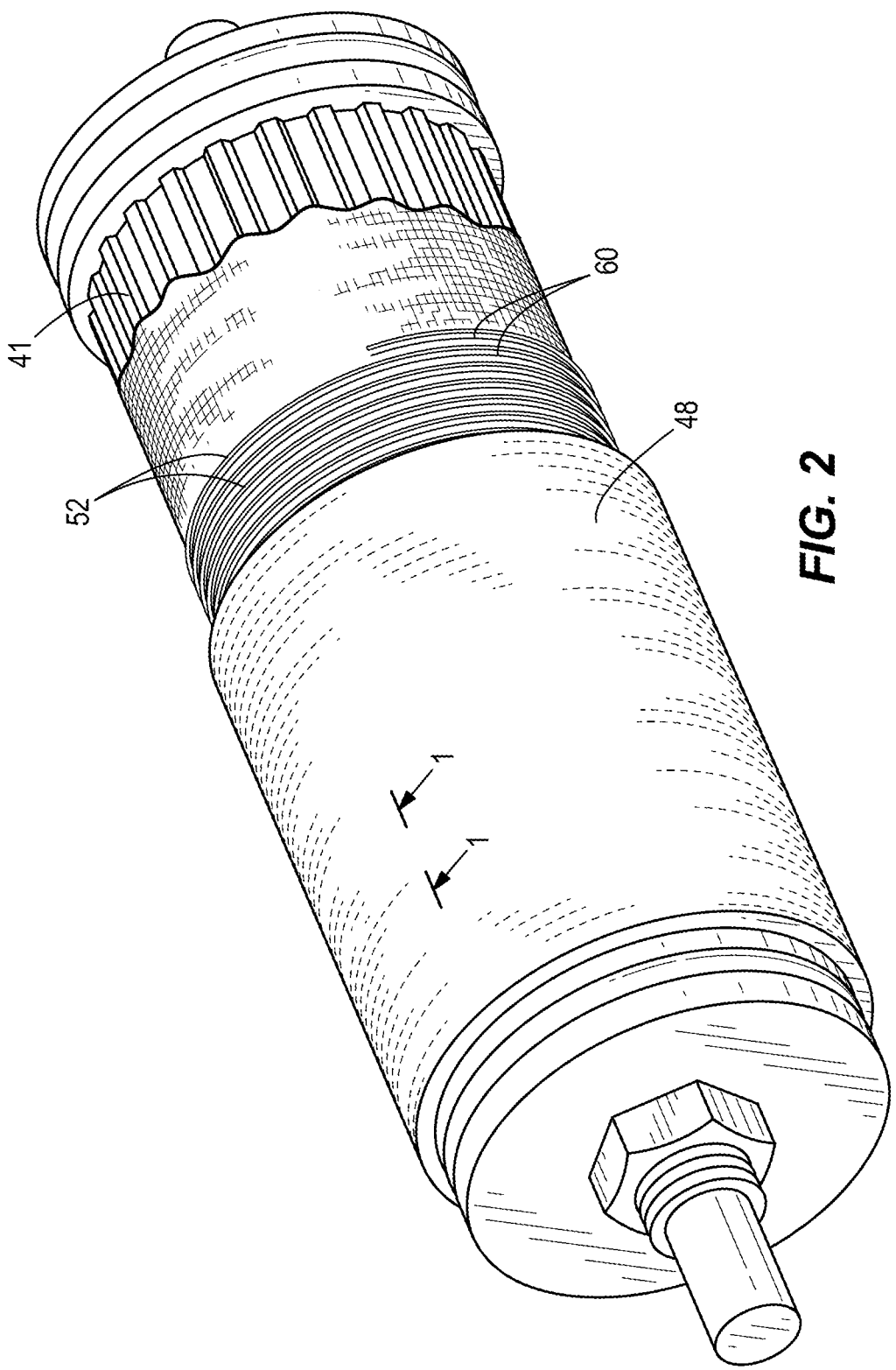
FIG. 2 is a perspective view showing a construction method for forming the conductive timing belt of FIG. 1 on a drum.

As shown in FIG. 2, the belt 20 can be constructed in a method or process similar in some respects to that of U.S. Pat. No. 4,626,232, the entire contents of which are incorporated by reference herein. For example, the fabric layer 36 formed as a tube can be slipped onto a notched or grooved drum 41 and, prior to application of the polymeric body 48 onto the fabric layer 36, the tensile section can be applied by wrapping the tensile reinforcement member 52 in multiple turns or windings about the fabric layer 36 with a laydown wheel. Thereafter, a loop of material to form the polymeric body 48 can be applied in a non-cured state to cover the fabric layer 36 and the windings of the tensile reinforcement member 52. Heat and/or pressure are then applied to cause the polymeric body 48 to conform the fabric layer 36 to the drum 41 to form the teeth 28. The polymeric body 48, which can contain reinforcing fibers embedded therein, exudes through the tensile reinforcement member 52 during formation.

In addition to the tensile reinforcement member 52, an additional conductive strand or strands 60 are provided in the belt 20 along the interior surface 40 of the fabric layer 36 as shown in FIGS. 1 and 2. The conductive strand or strands 60 is/are distinct from the tensile reinforcement member 52, and may be either spaced therefrom or in contact therewith. In addition, the material of the conductive strand or strands 60 can have an elastic modulus less than that of the material from which tensile reinforcement members 52 are constructed. Like the tensile reinforcement member 52, the conductive strand or strands 60 can include multiple continuous windings or turns around the entire loop formed by the belt 20. In fact, the method of manufacturing the belt 20 can include applying the windings or turns of the conductive strand or strands 60 onto the fabric layer 36 in a single combined step with the tensile reinforcement member 52 (e.g., applying paired windings of the tensile reinforcement member 52 and the conductive strand 60 at once with the laydown wheel). In other constructions, the conductive strand 60 can be applied before or after the application of the tensile reinforcement member 52. Both the tensile reinforcement member 52 and the conductive strand or strands 60 extend spirally about the interior surface 40 of the fabric layer 36. The conductive strand or strands 60 form an additional layer, or back-up conductive layer, directly interior to the fabric layer 36. Although each conductive strand 60 can be a strand that is spun to include multiple filaments or fibers, the back-up conductive layer formed by the conductive strand or strands 60 is a non-woven layer (i.e., not woven or knit into a fabric or cloth). The belt 20 can be constructed from a belt sleeve manufactured as described above and detailed in U.S. Pat. No. 4,626,232, with the belt sleeve being slit, after shaping, into a plurality of similar belts 20. The belt sleeve from which the belts 20 are slit has two opposing edges, and each tensile reinforcement member 52 is formed from multiple windings or turns between the two opposing edges so that at least one full winding, and in most constructions multiple windings, is contained in each belt 20. Likewise, the conductive strand or strands 60 is formed from multiple windings or turns between the two opposing edges so that at least one full winding, and in most constructions multiple windings, is contained in each belt 20. The illustrated example shows 8 to 9 windings in each belt 20, but the number may be less than 8 or more than 9 in other embodiments.

The tensile reinforcement member 52 may be a single continuous strand extending spirally throughout the belt 20 (and throughout the sleeve from which the belt 20 is slit). However, if the tensile reinforcement member 52 is of a twisted construction having a final twist direction (i.e., either of a so-called "S-twist" or "Z-twist") and neutral belt tracking is desired during use of the belt 20, then the belt 20 can include two oppositely-twisted strands arranged in an alternating pattern to form the tensile section. Likewise, it is possible that the belt 20 includes a single continuous conductive strand 60 extending spirally from edge to edge of the belt 20, or that multiple conductive strands 60 (e.g., of spun yarn) having opposite twist directions are alternated throughout the belt 20.

In some constructions, each conductive strand 60 includes a yarn or thread strand of non-conductive textile having a conductive coating applied thereon. For example, the conductive strand 60 can be formed of nylon, such as a nylon thread. The conductive coating can be a solvated or aqueous rubber dip with carbon black, carbon nanotubes, or metallic powder and the like applied to the non-conductive textile. Alternately, or in addition, the belt 20 can include one or more conductive strands 60 of metallic wire (e.g., steel, brass, copper). When a non-metallic strand or strands 60 are used, the sizing may be expressed in terms of denier, and the strand or strands 60 may be 10 denier or greater. As shown, a diameter of the conductive strand 60 can be less than a diameter of the tensile reinforcement member 52, and may be 25 percent or less than the diameter of the tensile reinforcement member 52. As such, there is a greater spacing distance between the second surface 44 and the conductive strands 60 than a spacing distance between the second surface 44 and the tensile reinforcement member 52. In other constructions, the conductive strand 60 and the tensile reinforcement member 52 may be of equal diameter. Though circular cross-sections are illustrated, other cross-sections are optional such as other rounded shapes, and even square or rectangular, and the dimensional relationships expressed above may also apply when the cross-section(s) are non-circular. For example, "diameter" as used above may be replaced by "width", "height", or "maximal cross-sectional dimension".

By constructing the belt 20 with the back-up conductive layer of conductive strand(s) 60 behind the facing fabric layer 36, the anti-static property or conductivity of the belt 20 can be less susceptible to degradation with wear of the fabric layer 36 so that the anti-static properties are more long-lasting. However, further to this advantage, the belt 20 when new can provide a greatly reduced electrical resistance compared to the fabric layer 36, since the conductive strand (s) 60 form a parallel conductive path with the fabric layer 36. The resistance of the conductive strands(s) 60 can be about equal to the resistance of the fabric layer 36 (e.g., same +/−10 percent), or much less than the resistance of the fabric layer 36 (e.g., less than 10 percent thereof, or even less than 1 percent thereof), or even greater than the resistance of the fabric layer 36. In some cases, the resistance of the conductive strand(s) 60 is much higher than the resistance of the fabric layer 36 (e.g., the fabric layer resistance can be less than 10 percent, or even less than 1 percent of the resistance of the conductive strand(s) 60) Even when the resistance of the conductive strand(s) 60 is comparatively higher than the fabric layer 36, the resultant resistance of the belt 20 as a whole is less than if the same fabric layer 36 was provided without the conductive strand(s) 60 due to the principle of parallel resistors. Although a rubber compound for forming the polymeric body 48 can also be made conductive, for example, through conductive carbon black additive, the implementation of the back-up conductive layer of conductive strand(s) 60 may render it unnecessary, especially since the amount of carbon black that can be added to the rubber compound is practically limited by an adverse viscosity-increasing effect.

The term "conductive" as used herein may refer to electrical conductivity corresponding to a resistance in ohms not exceeding $6 \times 10^5$ L/w in accordance with ISO 9563:2015 and the measurement procedures therein, or alternately to a resistance not exceeding 6 megaohms in accordance with the Power Transmission Belt Technical Bulletin (IP-3-3) of the Rubber Manufacturers Association and the measurement procedures therein.

What is claimed is:

1. A conductive anti-static endless drive belt comprising:
   a first surface provided as a drive surface having a plurality of tooth formations therein with a land portion formed between each adjacent pair of the plurality of tooth formations, wherein the drive surface is provided by a facing fabric having electrically conductive properties, and wherein the facing fabric has an interior surface opposite the drive surface;
   a second surface provided opposite the drive surface, the second surface being provided by a polymeric body that conforms to and is mated with the interior surface of the fabric layer;
   at least one tensile reinforcement member at least partially encased in the polymeric body and extending along a lengthwise direction of the belt along the interior surface of the fabric layer at each land portion throughout a loop formed by the belt; and
   a conductive strand partially encased in the polymeric body and extending with the at least one tensile reinforcement member along the lengthwise direction, the conductive strand extending along the interior surface of the facing fabric, and in direct contact therewith, at each land portion.

2. The conductive anti-static endless drive belt of claim 1, wherein the at least one tensile reinforcement member includes a cord of fiberglass, carbon fiber, para-aramid, or PBO.

3. The conductive anti-static endless drive belt of claim 1, wherein the conductive strand includes a yarn or thread strand of non-conductive textile having a conductive coating applied thereon.

4. The conductive anti-static endless drive belt of claim 3, wherein the conductive coating is a solvated rubber dip with carbon black, or carbon nanotubes, or metallic powder.

5. The conductive anti-static endless drive belt of claim 1, wherein the conductive strand is a first conductive strand extending spirally throughout the belt, and the belt includes a second conductive strand extending spirally throughout the belt.

6. The conductive anti-static endless drive belt of claim 1, wherein the conductive strand includes a metallic wire.

7. The conductive anti-static endless drive belt of claim 1, wherein the conductive strand and the at least one tensile reinforcement member extend spirally about the interior surface of the facing fabric.

8. The conductive anti-static endless drive belt of claim 1, wherein the polymeric body is formed of a non-conductive rubber compound.

9. The conductive anti-static endless drive belt of claim 1, wherein the polymeric body is formed of a conductive rubber compound.

10. The conductive anti-static endless drive belt of claim 1, wherein the facing fabric comprises two or more layers of conductive fabric.

11. The conductive anti-static endless drive belt of claim 1, wherein a resistance of the conductive strand is less than 10 percent of a resistance of the facing fabric.

12. The conductive anti-static endless drive belt of claim 1, wherein a resistance of the conductive strand is less than 1 percent of a resistance of the facing fabric.

13. The conductive anti-static endless drive belt of claim 1, wherein a resistance of the conductive strand is higher than a resistance of the facing fabric.

* * * * *